Patented Nov. 4, 1952

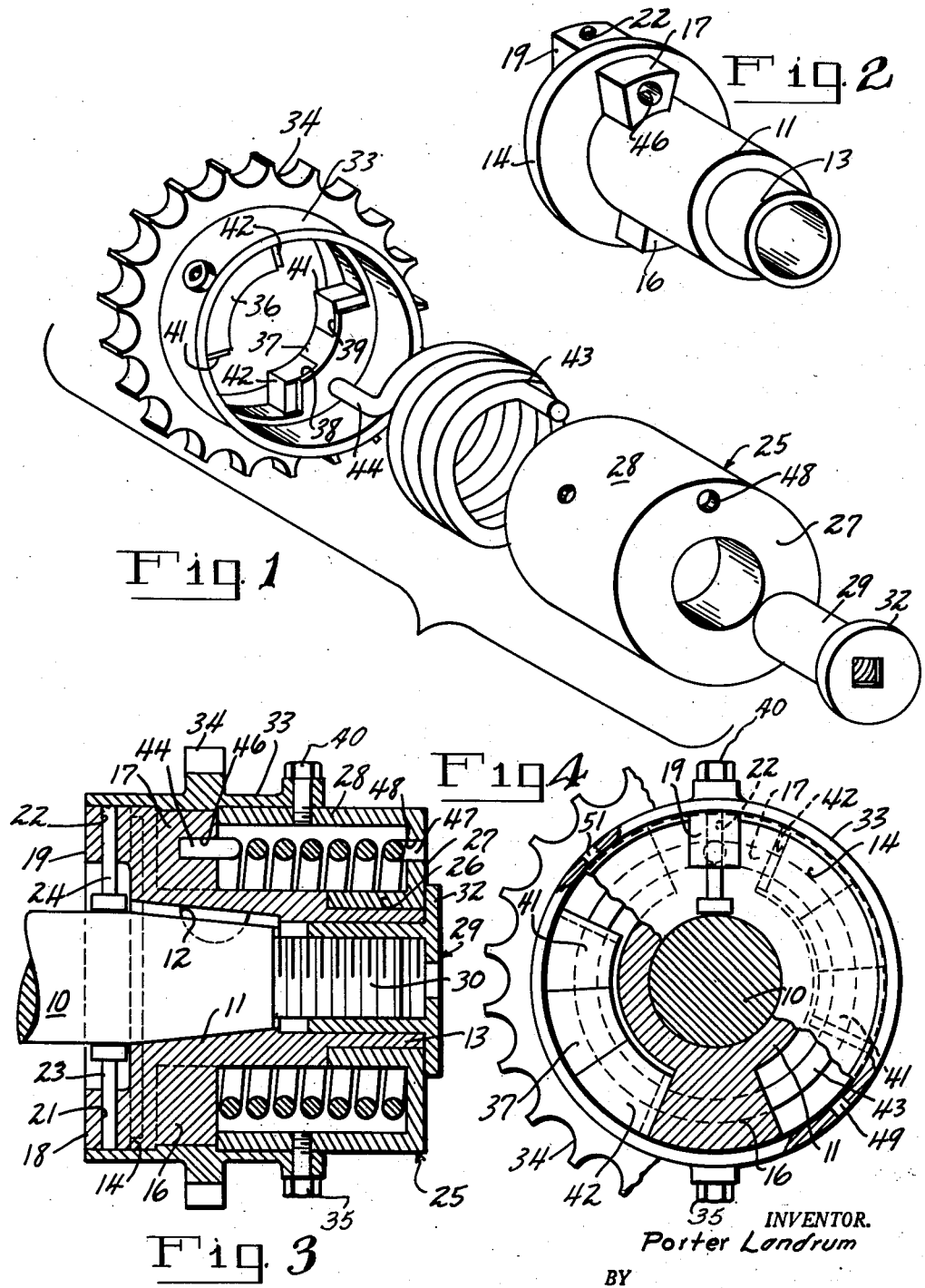

2,616,274

UNITED STATES PATENT OFFICE 2,616,274

POWER COUPLING

Porter Landrum, Birmingham, Ala.

Application February 20, 1947, Serial No. 729,866

3 Claims. (Cl. 64—27)

This invention relates to a device for transmitting a pulsating torque from a driving to a driven shaft, such for example as from the drive shaft of an internal combustion engine to the shaft driven thereby, and in particular is an improvement over that mechanism disclosed in my prior Patents Numbers 2,175,473, dated October 10, 1939 and 2,233,539, dated March 4, 1941.

Among the objects of my invention are to provide a power transmitting device including a torsional spring interposed between the driving and the driven members which shall embody improved means for securing the ends of the spring; improved cam or clutch elements cooperating between the driving and driven elements; shock absorbing means interposed between the driving and driven cam or clutch elements which are effective to absorb shocks when the elements engage, thus materially reducing strain imposed on the parts, and eliminating noise of operation; means effective in event the spring breaks to connect the driving and driven members rigidly together; and to provide such a device which is simple of design and operation, economical of manufacture, and capable of rendering trouble free service for a long period of time.

In the operation of internal combustion engines, it is well known that the pressure in the cylinder with direct transmission from the driving to a driven shaft, varies from a maximum at the beginning of the power stroke to subatmospheric pressure during the intake stroke. Also, with so pronounced a reduction in pressure, the power produced reduces very rapidly, so that the full power of the explosion in the cylinder at the beginning of the stroke does not culminate in useful work because of the inability of rigidly connected parts to yield to the high pressure, but is dissipated in heat. There is thus lost a considerable percentage of the power of the engine. I have found that with a yielding resilient transmission, properly designated, such as is herein disclosed and claimed, the power developed by an internal combustion engine may be materially increased, the pulsations of power transmitted smoothed out so that the parts are subjected to less wear and tear, and a much smoother, satisfactory operation obtained.

A device embodying features of my invention is illustrated in the accompanying drawing, forming a part of this application, in which, Fig. 1 is an exploded perspective view of the driven elements in my improved device;

Fig. 2 is a perspective view of the driving member;

Fig. 3 is a longitudinal sectional view; and

Fig. 4 is an end view with parts broken away and in section.

Referring to the drawing for a better understanding of my invention, I show in Fig. 3 a driving shaft 10 having mounted thereon a sleeve 11, secured to the shaft as by a key 12. The sleeve 11 is provided on its outer end with a reduced diameter portion 13 and on its opposite end with an enlarged diameter portion 14. Also provided on the sleeve, preferably as an integral part thereof, are clutch, or cam elements, 16 and 17. Adjacent the enlarged portion 14 are two overhanging lugs 18 and 19 provided with radial openings 21 and 22 in which are slidably mounted a pair of pins 23 and 24, the purpose of which will appear hereinafter in this specification.

Mounted for rotational movement on the reduced diameter portion 13 of the driving sleeve is a driven member 25 having a reduced diameter cylindrical portion 26 fitting about the reduced portion 13 of the driving sleeve; an end wall 27, and an outer cylindrical portion 28. The driven member is held against displacement on the driving sleeve by means of a sleeve nut 29, screwed onto the outer threaded portion 30 of the shaft 10 and having a flange 32 against which the end wall 27 of the driven member bears. Also mounted on the driven member and secured thereto by bolts 40 and 35 so as to form a part thereof is a sprocket member 33 having sprocket teeth 34. The sprocket member, as shown in Fig. 3 of the drawing, overhangs the enlarged portion 14 of the driving sleeve 11 and the lugs 18 and 19. On the interior of the sprocket member 33 are disposed cam or clutch elements 36 and 37, which are preferably formed as integral parts of the sprocket member. Each of the clutch elements is provided at its ends with pockets 38 and 39 to receive rubber pads 41 and 42 for engagement with the clutch element 16 and 17 of the driving sleeve 11. As may be seen in Fig. 3 of the drawing, the outer cylindrical portion 28 forms with the driving sleeve and the end wall 27, a housing in which is disposed a helical, torsional spring 43. One end, 44, of the spring is positioned in a recess 46 in the clutch element 17 of the driving sleeve 11. The opposite end 47 of the spring is disposed within a recess 48 in the end wall 27 of the driven member 25. The spring 43 is placed under an initial tension so that the clutch elements 16 and 17, carried by the driving sleeve 11, are biased tightly against the rubber pads 42 when no power is being transmitted. If we assume the shaft 11, as viewed in Fig. 4 of the drawing, to be driven in a counter-clockwise direction, the spring 43 will be placed under a greater tension at each pulsation of power and the clutch elements 16 and 17, will leave the pads 42 and approach the pads 41. As the pulsation deminishes in force, the clutch elements 16 and 17 approach their original position against the pads 42. The result is that a uniform torque is applied to the driven member and sprocket 33. The rubber pads 41 and 42 prevent any shock due to engagement with the clutch elements 16 and 17. The clutch elements 16 and 17 and 36 and 37 are of such size that the maximum relative movement between the driving sleeve 11 and the sprocket member 33 is approximately 45°. I have found that the spring 43 should be of such strength and should be placed under such tension that the clutch elements 16 and 17, when power is being transmitted under ordinary circumstances, will not contact the pads 41.

The sprocket member 33 is provided with diametrically opposed openings 49 and 51 which are adapted to register with the openings 21 and 22 in the lugs 18 and 19, carried by the driving sleeve 11, whenever the clutch elements 16 and 17 engage with the pads 41, in advance of their direction of rotation, and compress the pads slightly, which would occur if the spring 43 should break. When this occurs, the pins 23 and 24 are thrown outwardly by centrifugal force to engage in the openings 49 and 51 and thus lock the driving and driven elements together. This would prevent breakage of the parts due to pounding which would occur if the spring 43 was broken.

From the foregoing it will be apparent that I have devised an improved resilient power transmission for transmitting a pulsation torque which is simple of design and operation and effective to iron out power pulsations such as are imparted by an internal combustion engine. While I have shown my invention in but one form it will be apparent to those skilled in the art that it is not so limited but that it is susceptible of various changes and modifications, without departing from the spirit thereof, and I desire, therefore, that only such limitations shall be placed thereupon as are specifically set forth in the appended claims.

What I claim is:

1. In a power transmission including a driving member and a driven member with a helical, torsional spring interposed therebetween and having its opposite ends anchored to the driving and driven members, a radially disposed pin slidably mounted in the driving member, and a recess provided in the driven member and disposed to be engaged by the radially disposed pin upon extreme travel of the driving member with respect to the driven member.

2. In a power transmission including a driving member and a driven member, a torsional spring operatively connecting the driving member to the driven member and permitting relative rotational movement therebetween, there being recesses in the driven member, and outwardly movable members carried by the driving member disposed to engage in said recesses and rigidly lock the driving and driven members together after predetermined relative rotation therebetween.

3. In a power transmission embodying driving and driven members, a torsional spring through which the driving member drives said driven member, rubber pads disposed between said members and adapted to absorb operational shocks imposed on the driven member by the driving member, there being recesses in the driven member, and outwardly movable pins carried by the driving member disposed to engage in said recesses and lock the driving and driven members together in the event of failure of said spring.

PORTER LANDRUM.

REFERENCES CITED

The following references are of record in the file of this patent:

UNITED STATES PATENTS

| Number | Name | Date |
|---|---|---|
| 708,455 | Blake | Sept. 2, 1902 |
| 1,146,495 | Hamel | July 13, 1915 |
| 1,714,105 | Ramsdell | May 21, 1929 |
| 2,175,473 | Landrum | Oct. 10, 1939 |
| 2,233,539 | Landrum | Mar. 4, 1941 |